United States Patent
Bohne et al.

(10) Patent No.: US 10,332,016 B2
(45) Date of Patent: Jun. 25, 2019

(54) COMPARISON OF FEATURE VECTORS OF DATA USING SIMILARITY FUNCTION

(71) Applicant: MORPHO, Issy les Moulineaux (FR)

(72) Inventors: Julien Bohne, Issy les Moulineaux (FR); Stephane Gentric, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 844 days.

(21) Appl. No.: 14/931,606

(22) Filed: Nov. 3, 2015

(65) Prior Publication Data
US 2016/0125308 A1 May 5, 2016

(30) Foreign Application Priority Data
Nov. 5, 2014 (FR) .................... 14 60690

(51) Int. Cl.
*G06K 9/00* (2006.01)
*G06K 9/62* (2006.01)
*G06N 7/00* (2006.01)
*G06N 20/00* (2019.01)

(52) U.S. Cl.
CPC .......... *G06N 7/005* (2013.01); *G06K 9/00288* (2013.01); *G06K 9/6278* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,782,362 | B1 * | 8/2004 | Hon ................ | G10L 15/14 704/240 |
| 2004/0002860 | A1 * | 1/2004 | Deisher ............ | G10L 21/0208 704/233 |
| 2008/0195387 | A1 * | 8/2008 | Zigel ................ | G10L 17/06 704/236 |
| 2009/0067726 | A1 * | 3/2009 | Erol ................. | G06F 17/30247 382/197 |

(Continued)

OTHER PUBLICATIONS

Frey, B.J. (2003). Transformation-Invariant Clustering Using the EM Algorithm. IEEE Transactions on Pattern Analysis and Machine Intelligence, vol. 25, No. 1, Jan. 2003. 17 pages. (Year: 2003).*

(Continued)

*Primary Examiner* — Li B. Zhen
*Assistant Examiner* — Benjamin J Buss
(74) *Attorney, Agent, or Firm* — Womble Bond Dickinson (US) LLP (57) ABSTRACT

The invention concerns a method to compare two data obtained from a sensor or interface, carried out by processing means of a processing unit, the method comprising the computing of a similarity function between two feature vectors of the data to be compared,
characterized in that each feature vector of a datum is modelled as the summation of Gaussian variables, said variables comprising:
  a mean of a class to which the vector belongs,
  an intrinsic deviation, and
  an observation noise of the vector,
each feature vector being associated with a quality vector comprising information on the observation noise of the feature vector,
and in that the similarity function is computed from the feature vectors and associated quality vectors.

9 Claims, 2 Drawing Sheets

(56) References Cited

U.S. PATENT DOCUMENTS

| | | | | |
|---|---|---|---|---|
| 2009/0141932 A1* | 6/2009 | Jones | .................... | G06K 9/036 |
| | | | | 382/100 |
| 2009/0144033 A1* | 6/2009 | Liu | .................. | G06F 17/30247 |
| | | | | 703/2 |
| 2013/0157683 A1* | 6/2013 | Lymberopoulos | ...... | H04W 4/04 |
| | | | | 455/456.1 |
| 2014/0107521 A1* | 4/2014 | Galan | ................ | A61B 5/04008 |
| | | | | 600/544 |
| 2015/0269744 A1* | 9/2015 | Mukherjee | ............... | G06K 9/44 |
| | | | | 382/103 |

OTHER PUBLICATIONS

French Search Report and Written Opinion, dated Jul. 23, 2015, French Application No. 1460690.

Cao, Xudong, et al., "A Practical Transfer Learning Algorithm for Face Verification", *2013 IEEE International Conference on Computer Vision*, (2013), 3208-3215.

Chen, Dong, et al., "Bayesian Face Revisited: A Joint Formulation", *Computer Vision ECCV 2012*, (Oct. 7, 2012), 566-579.

Prince, Simon, et al., "Probabilistic Models for Inference About Identity", *IEEE Transactions on Pattern Analysis and Machine Intelligence*, vol. 34, No. 1, (Jan. 2012), 144-157.

Wang, Xiaogang, et al., "A Unified Framework for Subspace Face Recognition", *IEEE Transactions on Pattern Analysis and Machine Intelligence*, vol. 26, No. 9, (Sep. 2004), 1222-1228.

\* cited by examiner

COMPARISON OF FEATURE VECTORS OF DATA USING SIMILARITY FUNCTION

FIELD OF THE INVENTION

The invention concerns a method for comparing data obtained from a sensor or interface to determine a rate of similarity between the data. In particular the invention concerns a data comparison method via machine learning.

STATE OF THE ART

Numerous tasks implemented in the field of computer vision (or digital vision) for example require the comparison of complex data such as images to obtain a similarity score between such data.

For example, in the field of biometric authentication, face images of individuals are compared to determine whether the images have been obtained from the same person.

To treat this type of problem it is known to carry out an extraction of features from the data to be compared, the extraction of features converting the data to be compared into feature vectors, and subsequently to compute a similarity function between the feature vectors.

The computed similarity function generally comprises parameters that are a priori unknown. These parameters are determined and progressively optimised by machine learning. To do so, a processing unit conducts data comparison operations on a set of data known from a database, compares the results given by the similarity function with a real result and optimises the parameters of the similarity function accordingly for more reliable results.

For example from the publication by D. Chen, X. Cao L. Wang, F. Wen and J. Sun, *Bayesian Face Revisited: A Joint Formulation*, in ECCV, 2012, a learning method is known for a similarity function between data wherein the data are modelled by summation of two independent Gaussian variables: the mean of the class to which one datum belongs and the variation of the datum relative to the mean.

For example, if the data are images of faces, the class corresponds to the identity of the subject, and therefore the variation relative to the mean of the class corresponds to all the changes which may occur between a mean face image of the subject and an image taken under different circumstances:

Lighting, shadows on the image,
Facial pose in the image,
Face expression,
Local blur, etc.

However, an improvement in the performance level of comparison resulting from machine learning is limited by the fact that data of varying quality are taken into account in the database. As a result the determined similarity function shows deteriorated performance and hence deteriorated quality of comparison. The proposed comparison method is therefore not entirely reliable.

DISCLOSURE OF THE INVENTION

It is the objective of the invention to propose a data comparison method having improved performance compared with the prior art.

In this respect the subject of the invention is a method to compare two computer data items, obtained from a sensor or interface, carried out by processing means of a processing unit, the method comprising the computing of a similarity function between two feature vectors of the data to be compared, characterized in that each feature vector of a datum is modelled as the summation of Gaussian variables the said variables comprising:
  a mean of a class to which the vector belongs,
  an intrinsic deviation, and
  observation noise of the vector
each feature vector being associated with a quality vector comprising information on the observation noise of the feature vector, and in that the similarity function is computed from the feature vectors and from the associated quality vectors.

Advantageously but optionally, the method of the invention may further comprise at least one of the following characteristics:

the similarity function is the logarithm of the ratio between the probability density $P(x,y|H_{sim}, S_{\varepsilon_x}, S_{\varepsilon_y})$ of the feature vectors with the vectors belonging to one same class, and the probability density $P(x,y|H_{dis}, S_{\varepsilon_x}, S_{\varepsilon_y})$ of the feature vectors with the vectors belonging to two different classes.

The similarity function is also computed as a function of the covariance matrices of the components of the feature vectors, and the covariance matrix of the observation noise of each feature vector is obtained as a function of the associated quality vector.

The method further comprises the implementation of a learning algorithm to determine the covariance matrices of the means of the classes to which the vectors belong and vector deviations relative to the class means.

The learning algorithm is an algorithm of expectation—maximization type;

The similarity function is given by the formula:

$$LR(x,y|S_{\varepsilon_x}, S_{\varepsilon_y}) = x^T(A-(S_\mu+S_\omega+S_{\varepsilon_x})^{-1})x + y^T(C-(S_\mu+S_\omega+S_{\varepsilon_y})^{-1})y + 2x^T By - \log|S_\mu+S_\omega+S_{\varepsilon_x}| - \log|A| + \text{constant}$$

where:

$$A = (S_\mu + S_\omega + S_{\varepsilon_x} - S_\mu(S_\mu+S_\omega+S_{\varepsilon_y})^{-1}S_\mu)^{-1}$$

$$B = -AS_\mu(S_\mu+S_\omega+S_{\varepsilon_y})^{-1}$$

$$C = (S_\mu+S_\omega+S_{\varepsilon_y})^{-1}(I+S_\mu AS_\mu(S_\mu+S_\omega+S_{\varepsilon_y})^{-1})$$

and where $S_\mu$ is the covariance matrix of the means of the classes (inter-class covariance matrix), $S_\omega$ is the covariance matrix of the deviations relative to a mean (intra-class covariance matrix), and $S_{\varepsilon_x}$ and $S_{\varepsilon_y}$ are the covariance matrices of the observation noises of vectors x and y respectively;

The computer data derived from sensors or interfaces are data representing physical objects or physical magnitudes;

The computer data derived from sensors or interfaces are images, and the feature vectors are obtained by applying at least one filter to the images;

The components of the quality vector are generated as a function of type of datum and type of features forming the feature vector;

The method further comprises the comparison of the result of the computed similarity function with a threshold to determine whether the data belong to a common class.

A further subject of the invention is a computer programme product comprising code instructions to implement the method according to the preceding description when executed by processing means of a processing unit.

A further subject of the invention is a system comprising:
- a database comprising a plurality of so-called labelled data;
- a data acquisition unit; and
- a processing unit comprising processing means adapted to construct two feature vectors and two associated quality vectors from two data items, said processing unit also being adapted to compare the data by implementing the comparison method according to the preceding description.

The proposed method allows data quality to be taken into account when computing the similarity function between data. This makes it possible to use variable weighting between data of good quality and more uncertain data.

For example when the method of the invention is applied to a comparison of images, the shadow or blur regions of an image are not taken into account by the similarity function with as much weighting as the clearly visible, clearly distinct regions.

Increased performance of data comparison is thereby obtained.

Additionally, machine learning allows optimisation of the similarity function parameters and hence improved performance of the comparison method.

DESCRIPTION OF THE FIGURES

Other characteristics, objectives and advantages of the invention will become apparent from the following non-limiting description given solely for illustration and is to be read in connection with the appended drawings in which.

DETAILED DESCRIPTION OF AT LEAST ONE EMBODIMENT OF THE INVENTION

Figure 1:
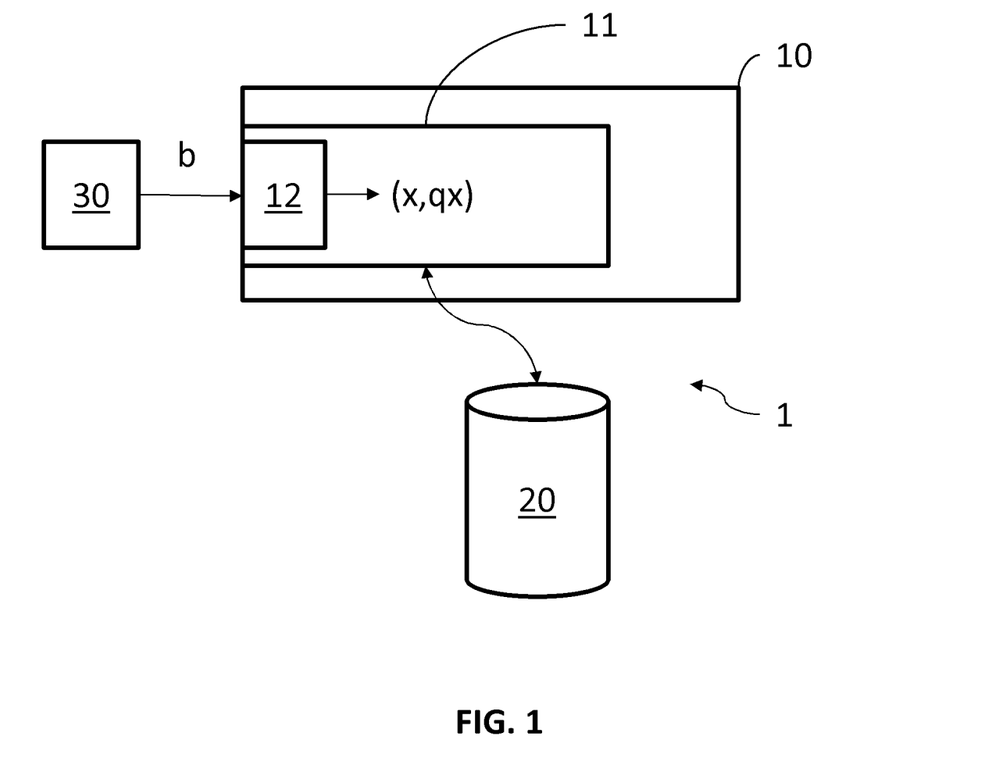
FIG. 1 illustrates an example of a system adapted to implement a comparison method.

With reference to FIG. 1, a system 1 is illustrated comprising a processing unit 10, comprising processing means 11 to implement the computer data comparison method described below.

The processing unit 10 may be an integrated circuit for example and the processing means may be a processor.

Advantageously the system 1 further comprises an optionally remote database 20 storing in memory a plurality of data used by the processing unit 10 to carry out machine learning as described below.

Finally, the system 1 comprises a data acquisition unit 30, or if the data acquisition unit 30 is independent of the system it comprises an interface (not illustrated) adapted to communicate with such a unit. In this manner the system 1 is able to receive and process data b, in particular for comparison thereof using the method described below.

Depending on the type of data to be compared in the method described below, the data acquisition unit may be of any type e.g. an optical sensor (photographic camera, video camera, scanner), acoustic sensor, fingerprint sensor, movement sensor etc. It may also be a Man-Machine interface (keypad, tablet with touch-screen interface) to record data entered by an operator such as a text, figure, etc.

The computer data b are obtained by the acquisition unit 30, and are therefore derived from a sensor or interface e.g. a Man-Machine interface. They may be data representing a physical object e.g. an image, a schematic, a recording, a description, or representing a physical magnitude (electric, mechanical, thermal, acoustic, etc.), for example data recorded by a sensor.

The processing means 11 of the processing unit are advantageously configured to perform the data comparison method described below by executing a suitable programme.

To implement this method, the processing means 11 also advantageously comprise a feature extracting module 12 adapted to generate—from an input computer datum b communicated by a data acquisition unit 30—an extraction of features to generate a feature vector x associated with the datum and a quality vector qx of the datum associated with the feature vector.

The quality vector qx may be a vector of same size as the feature vector and each element thereof indicates a quality of the information contained in the corresponding element of the feature vector x. Alternatively, the quality vector qx may be of any size. The generation thereof is dependent on the type of datum b.

For example, feature extraction can be performed by applying to datum b one or more filters designed for this purpose, optionally followed by processing of the filtering result (e.g. computed histogram, etc.).

The generation of the quality vector is dependent on the type of datum b and type of features of the feature vector x—i.e. component elements of vector x. Each element of the quality vector takes into account intrinsic datum-related information associated with the particular features of the feature vector.

For example, in the field of signal processing or image processing, when the datum is an image or acquisition of a representative signal acquired by a sensor, it is frequent to use as feature vector x a frequency representation (e.g. Fourier transform) or spatial-frequency representation (e.g. wavelet transform) of the data. Each component of the feature vector then only depends on some frequency bands.

In such cases, the high frequency components of the datum may prove to be more discriminating than low frequency components, but also more sensitive to phenomena such as the presence of noise or lack of signal resolution.

The amount of noise in the datum can be determined by analysing its energy spectrum if the datum is a signal acquired by a sensor, or its intrinsic resolution if the datum is an image. For example the article by Pfenning and Kirchner is known for determination of the resolution of an image: «Spectral Methods to Determine the Exact Scaling Factor of Resampled Digital Images», ISCCP, 2012.

The quality vector qx generated as a function of the feature vector x and of the intrinsic quality of the datum can then be constructed as follows:
- High quality is attributed to the components of the feature vector that are sensitive to the low frequency components of the datum;
- High quality is attributed to the components of the feature vector that are sensitive to the high frequency components of the datum and have low noise level and/or high resolution;
- Low quality is attributed to the components of the feature vector that are sensitive to the high frequency components and have a high noise level and/or low resolution.

The attributed quality values and thresholds for noise level or resolution can be determined experimentally to optimise the performance of the comparison method on a validation basis.

According to another example, the datum is a face image.

According to this example, a feature vector can be obtained as shown in the article by Chen et al., «Blessing of Dimensionality: High-dimensional Feature and Its Efficient Compression for Face Verification», VCPR, 2013, by concatenating local descriptors extracted in the vicinity of certain semantic points of the face (e.g. tip of nose, corners of the mouth, eyes, etc.).

This representation has the advantage of being more robust against variations in pose than methods which extract descriptors on a regular grid.

However the extraction of these features comprises a step to detect these points. Throughout this step a detector can be used which in addition to providing the most probable position of each point of the face in the image, also provides information translating the confidence level of detection accuracy.

A measurement is known for example from the article by Rapp et al., «Blessing of Dimensionality: «Multiple kernel learning SVM and statistical validation for facial landmark detection», Automatic Face & Gesture Recognition, 2011, which measures the distance to the separating hyperplane when using a detector based on Support Vector Machines (SVM).

Another example is given in the article by Dantone et al. «Real-time Facial Feature Detection using Conditional Regression Forests", CVPR, 2012, wherein a measurement of confidence is given by a number of votes determined by a detector using regression trees.

This confidence information can be used to create a quality associated with each component of the feature vector by attributing thereto the quality of detection of the facial semantic point to which it corresponds.

According to a further example, when the face image is a face image generated from an image which is not a front image of the face e.g. by applying the method described in application N° FR 2 998 402, the quality vector may be a confidence index, this index being relatively higher for the points of the face occurring in the original image and relatively lower for the points of the face not occurring in the original image and reconstructed via extrapolation.

More generally, when the datum is an image the quality vector can be obtained by local measurement of blur.

Alternatively, the feature-extracting module is a module of the acquisition unit 30 enabling the acquisition unit to communicate directly with the processing means 11 a feature vector and an associated quality vector.

Data Comparison Method

Figure 2:
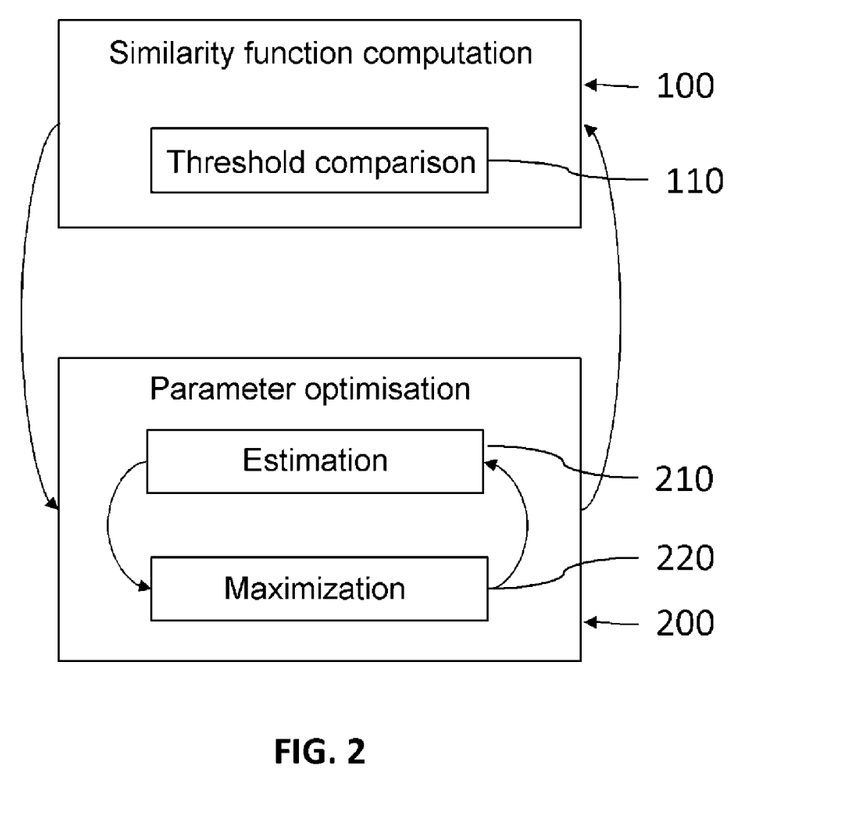
FIG. 2 illustrates the main steps of a data comparison method according to one embodiment of the invention.

With reference to FIG. 2 a description is now given of the data comparison method implemented by the processing means 11 of the processing unit.

This method comprises the comparison of two data items by calculating a similarity function 100 between two feature vectors x and y of same size obtained from the data respectively, and by performing machine learning 200 of the parameters of the similarity function on a database.

In this method each feature vector is modelled as the summation of three independent Gaussian variables:

$$x = \mu + \omega + \varepsilon$$

where:
  $\mu$ is the mean of a class to which vector x belongs;
  $\omega$ is the intrinsic deviation of vector x from the mean; and
  $\varepsilon$ is observation noise.

A class is a set of feature vectors considered to be similar. Two feature vectors are considered similar if their comparison by the similarity function produces a higher result than a threshold, this threshold being determined empirically.

For example, if the data are face images, a class advantageously corresponds to an individual. By comparing two feature vectors of several data, the data are considered to be similar if they originate from the same individual.

To return to the model previously described, two feature vectors belonging to one same class therefore have an identical value $\mu$, but different values of $\omega$ and $\varepsilon$.

If the feature vectors belong to different classes, the three variables are fully independent.

It is considered that these three variables follow a multivariate normal distribution centred at 0, and the respective covariance matrixes are written $S_\mu$, $S_\omega$, and $S_\varepsilon$. $S_\mu$ is called an inter-class covariance matrix, $S_\omega$ an intra-class covariance matrix and $S_\varepsilon$ an observation noise covariance matrix.

$S_\mu$, $S_\omega$ are unknowns common to all the feature vectors.

$S_\varepsilon$ on the other hand is known since it is obtained from the quality vector associated with the feature vector, by the feature extracting module. It is of same size as the associated feature vector.

For example, assuming that the observation noises do not correlate with one another, $S_\varepsilon$ can be well approximated by a diagonal matrix.

The elements of this diagonal matrix, then corresponding to the variance of the components of the quality vector, can be obtained from this vector.

For example, variance can be imposed by applying to the components of the quality vector qx a sigmoid function of type $f(q_x) = 1/e^{aq_x+b}$. The coefficients a and b can be chosen to associate a determined variance level with a quality level.

For example, a high quality can be associated with zero variance, a very low quality can be associated with maximum variance, the intermediate variances corresponding to intermediate qualities.

In general, since the quality vector and the feature vector depend on datum type, the transfer function which converts a quality vector to a noise covariance matrix is specific to the associated quality vector and feature vector.

In the remainder hereof $S_{\varepsilon x}$ denotes the covariance matrix of the background noise of vector x obtained from the quality vector qx, and $S_{\varepsilon y}$ is the covariance matrix of the background noise of vector y obtained from the quality vector qy.

$H_{sim}$ denotes the hypothesis that two feature vectors belong to one same class i.e. the corresponding data are considered to be similar, and $H_{dis}$ denotes the reverse hypothesis that the feature vectors belong to different classes and the corresponding data are considered to be dissimilar.

The joint probability of generating x and y, knowing their respective covariance matrixes of background noise and considering the hypothesis $H_{sim}$, is written $P(x,y|H_{sim}, S_{\varepsilon_x}, S_{\varepsilon_y})$. This probability follows a Gaussian law for which the centre is zero and the covariance matrix is $S_{sim}$: $P(x,y|H_{sim}, S_{\varepsilon_x}, S_{\varepsilon_y}) = N([x^T y^T]^T | 0, S_{sim})$.

The joint probability of generating x and y, knowing their respective covariance matrixes of background noise and considering the hypothesis $H_{dis}$, is written $P(x,y|H_{dis}, S_{\varepsilon_x}, S_{\varepsilon_y})$. This probability follows a Gaussian law for which the centre is zero and the covariance matrix is $S_{dis}$: $P(x,y|H_{dis}, S_{\varepsilon_x}, S_{\varepsilon_y}) = N([x^T y^T]^T | 0, S_{dis})$.

The matrixes and $S_{sim}$ and $S_{dis}$ are defined as follows:

$$S_{sim} = \begin{bmatrix} S_\mu + S_\omega + S_{\varepsilon_x} & S_\mu \\ S_\mu & S_\mu + S_\omega + S_{\varepsilon_y} \end{bmatrix}$$

-continued $$S_{dis} = \begin{bmatrix} S_\mu + S_\omega + S_{\varepsilon_x} & 0 \\ 0 & S_\mu + S_\omega + S_{\varepsilon_y} \end{bmatrix}$$

The probability density of $P(x,y|H_{sim}, S_{\varepsilon_x}, S_{\varepsilon_y})$ in a manner known per se is $$\frac{1}{(2\pi)^{N/2}|S_{sim}|^{\frac{1}{2}}} e^{-\frac{1}{2}x^T S_{sim}^{-1} x},$$

where $|S_{sim}|$ is the determinant of $S_{sim}$, and N is the dimension of a feature vector.

The same expression applies mutatis mutandis to the density probability $P(x,y|H_{dis}, S_{\varepsilon_x}, S_{\varepsilon_y})$.

The computed similarity function to compare the two data corresponding to the vectors x and y is the logarithm of the ratio between the probability density of the feature vectors with the vectors belonging to one same class, and the probability density of the feature vectors with the vectors belonging to two different classes.

The similarity function is therefore expressed as follows:

$$LR(x, y | S_{\varepsilon_x}, S_{\varepsilon_y}) = \log\left(\frac{P(x, y | H_{sim}, S_{\varepsilon_x}, S_{\varepsilon_y})}{P(x, y | H_{dis}, S_{\varepsilon_x}, S_{\varepsilon_y})}\right)$$

When using the expression of probability density indicated above, and when developing the function using the block inversion formula to invert the matrixes $S_{sim}$ and $S_{dis}$, the similarity function obtained is expressed as follows:

$$LR(x,y|S_{\varepsilon_x}, S_{\varepsilon_y}) = x^T(A - (S_\mu + S_\omega + S_{\varepsilon_x})^{-1})x + y^T(C - (S_\mu + S_\omega + S_{\varepsilon_y})^{-1})y + 2x^T By - \log|S_\mu + S_\omega + S_{\varepsilon_x}| - \log|A| + \text{constant}$$

In this expression, A, B and C are terms resulting from block inversion of $S_{sim}$ and are respectively expressed as follows:

$$A = (S_\mu + S_\omega + S_{\varepsilon_x} - S_\mu(S_\mu + S_\omega + S_{\varepsilon_y})^{-1} S_\mu)^{-1}$$

$$B = -A S_\mu (S_\mu + S_\omega + S_{\varepsilon_y})^{-1}$$

$$C = (S_\mu + S_\omega + S_{\varepsilon_y})^{-1}(I + S_\mu A S_\mu (S_\mu + S_\omega + S_{\varepsilon_y})^{-1})$$

The constant is not dependent on x,y, $S_{\varepsilon_x}$ or $S_{\varepsilon_y}$ and can therefore be ignored.

It is therefore found that the similarity function LR takes into account the covariance matrixes $S_{\varepsilon_x}$ and $S_{\varepsilon_y}$ of the observation noises of x and y, and hence takes into account the quality vector associated with each feature vector.

The result of comparison is therefore impacted by the quality—or confidence—associated with a feature vector, which allows lesser weighting of a feature considered to be of poor or uncertain quality and greater weighting of a feature of good quality or having greater confidence.

As will be seen in the remainder hereof, this similarity function is also parameterised by machine learning. By taking into account the quality associated with a feature vector, the impact of a datum of poor quality on the parameterising of the function can be minimised.

The comparison method is therefore more reliable.

Returning to FIG. 2, the result of comparison is then compared at a step 110 with a determined threshold.

This threshold is advantageously determined empirically by applying a large number of comparisons to known feature vectors in a database (that are known to belong or not belong to one same class).

If the result of the similarity function applied to x and y is higher than the determined threshold, the corresponding data are considered to be similar. Otherwise the data are considered to be dissimilar.

The expression of the similarity function LR indicated previously shows that this function is parameterised by the covariance matrixes $S_\mu$, $S_\omega$, which are unknown.

Therefore the method comprises a step 200 to determine said matrixes by machine learning.

This method is advantageously conducted using an expectation-maximization algorithm (EM) and is performed on a set of data stored in the database 20, this data being called «labelled» i.e. the respective classes to which they belong are known.

A class to which a number $m_c$ of feature vectors belongs is denoted c, and $X_c = [x_{c,1}^T, \ldots, x_{c,m_c}^T]^T$ denotes the concatenation of the feature vectors of the class and $$S_{\varepsilon_{c,1}}, \ldots, S_{\varepsilon_{c,m_c}}$$

denote their respective covariance matrixes of observation noise.

The latent variables $Z_c = [\mu_c, \omega_{c,1}^T, \ldots, \omega_{c,m_c}^T]^T$ are defined for each class c in which each $\mu_c$ is the class mean; there is therefore only one, and each $\omega_{c,i}$ is the deviation of a feature vector in the class from this mean (there is therefore one per feature vector).

The parameter to be estimated by the EM algorithm is $\Theta = \{S_\mu, S_\omega\}$.

The expectation-Maximisation algorithm is an iterative algorithm comprising a first step 210 to estimate the parameters of distribution of the latent variables $P(Z_c|X_c, \overline{\Theta})$, where $\overline{\Theta}$ is the preceding estimation of the parameters.

On initialisation of the method, $\overline{\Theta}$ is a first empirical estimation of the parameters.

The initialisation of parameter $S_\mu$ is advantageously obtained by calculating, for each class c, the empirical mean of the class and then determining a covariance matrix of the mean values.

The initialisation of parameter $S_\omega$ can be obtained by calculating, for each class, the covariance matrix of the feature vectors from which the class mean is subtracted (i.e. feature vector differences relative to the mean) and then calculating the mean covariance matrix on all classes.

The algorithm next comprises a maximization step 220 following $\Theta$ of the expected logarithmic likelihood on the latent variables $Z_c$:

$$Q(\Theta, \overline{\Theta}) = \sum_c \int P(Z_c | X_c, \overline{\Theta}) \log P(X_c, Z_c | \Theta) dZ_c$$

For the proper conducting of this step and to minimise computing time, consideration is given to the fact that the latent variables $\omega_{c,i}$ are conditionally independent of $\mu_c$ fixed by factorising $P(Z_c|X_c, \overline{S}_\mu, \overline{S}_\omega)$ as follows:

$$P(Z_c | X_c, \overline{S}_\mu, \overline{S}_\omega) = P(\mu_c | X_c, \overline{S}_\mu, \overline{S}_\omega) \prod_{i=1}^{m_c} P(\omega_{c,i} | x_{c,i}, \mu_c, \overline{S}_\mu, \overline{S}_\omega)$$

Optimisation of $Q(\Theta, \overline{\Theta})$ at step 220 requires computing the probability distributions of the parameters $P(\mu_c|X_c,\overline{S}_\mu,\overline{S}_\omega)$ and $P(\omega_{c,i}|x_{c,i},\mu_c,\overline{S}_\mu,\overline{S}_\omega)$. These computations are detailed below:

$$P(\mu_c | X_c, \overline{S}_\mu, \overline{S}_\omega) \propto P(X_c | \mu_c, \overline{S}_\omega)P(\mu_c | \overline{S}_\mu) \propto \quad (1)$$

$$\prod_{i=1}^{m_c} \mathcal{N}(x_{c,i} | \mu_c, \overline{S}_\omega + S_{\varepsilon_{c,i}}) \mathcal{N}(\mu_c | 0, \overline{S}_\mu) \propto$$

$$e^{-\frac{1}{2}\left(\mu_c^T \overline{S}_\mu^{-1} \mu_c + \sum_{i=1}^{m_c} (\mu_c - x_{c,i})^T (\overline{S}_\omega + S_{\varepsilon_{c,i}})^{-1} (\mu_c - x_{c,i})\right)} \propto$$

$$e^{-\frac{1}{2}\left((\mu_c - b_{\mu_c})^T T_{\mu_c}^{-1} (\mu_c - b_{\mu_c})\right)}$$

Where:

$$T_{\mu_c} = \left(\overline{S}_\mu^{-1} + \sum_{i=1}^{m_c} (\overline{S}_\omega + S_{\varepsilon_{c,i}})^{-1}\right)^{-1}$$

And $$b_{\mu_c} = T_{\mu_c} \sum_{i=1}^{m_c} (\overline{S}_\omega + S_{\varepsilon_{c,i}})^{-1} x_{c,i}$$

The combining of equation (1) and the fact that $P(\mu_c|X_c,\overline{S}_\mu,\overline{S}_\omega)$ is a distribution of probabilities implies that $P(\mu_c|X_c,\overline{S}_\mu,\overline{S}_\omega) = \mathcal{N}(\mu_c|b_{\mu_c}, T_{\mu_c})$. Additionally:

$$P(\omega_{c,i}|X_c,\overline{S}_\mu,\overline{S}_\omega) = \int P(\mu_c|X_c,\overline{S}_\mu,\overline{S}_\omega) P(\omega_{c,i}|x_{c,i},\mu_c,$$
$$\overline{S}_\omega)d\mu_c \propto \int \mathcal{N}(\mu_c|b_{\mu_c},T_{\mu_c}) \mathcal{N}(\omega_{c,i}|0,\overline{S}_\omega) \mathcal{N}(\omega_{c,i}|x_{c,i} -$$
$$\mu_c, S_{\varepsilon_{c,i}})d\mu_c \propto \int \mathcal{N}(\mu_c|b_{\mu_c},T_{\mu_c}) \mathcal{N}(\omega_{c,i}|R_{c,i}S_{\varepsilon_{c,i}}^{-1}(x_{c,i} -$$
$$\mu_c), R_{c,i})d\mu_c$$

Where $R_{c,i} = (S_{\varepsilon_{c,i}}^{-1} + \overline{S}_\omega^{-1})^{-1} \propto \int \mathcal{N}(\mu_c|b_{\mu_c},T_{\mu_c}) \mathcal{N}(\mu_c|x_{c,i} - R_{c,i}^{-1}S_{\varepsilon_{c,i}}\omega_{c,i}, R_{c,i}^{-1}S_{\varepsilon_{c,i}}R_{c,i}^{-1})d\mu_c$ $$P(\omega_{c,i} | X_c, \overline{S}_\mu, \overline{S}_\omega) =$$

$$\mathcal{N}\left(\omega_{c,i} \mid R_{c,i}S_{\varepsilon_{c,i}}^{-1}(x_{c,i} - b_{\mu_c}),\, R_{c,i}S_{\varepsilon_{c,i}}^{-1}T_{\mu_c}S_{\varepsilon_{c,i}}^{-1}R_{c,i} + R_{c,i}\right) =$$

$$\mathcal{N}\left(\omega_{c,i} \mid b_{\omega_{c,i}}, T_{w_{c,i}}\right)$$

Where:

$$T_{w_{c,i}} = R_{c,i}S_{\varepsilon_{c,i}}^{-1}T_{\mu_c}S_{\varepsilon_{c,i}}^{-1}R_{c,i} + R_{c,i}$$

And $$b_{\omega_{c,i}} = R_{c,i}S_{\varepsilon_{c,i}}^{-1}(x_{c,i} - b_{\mu_c})$$

Step 220 therefore entails maximising relative to $S_\mu$ and $S_w$:

$$\tilde{Q}(\Theta, \overline{\Theta}) \sum_{c=1}^{nb\, class.} \sum_{i=1}^{m_c} \int P(Z_c | X_c, \overline{S}_\mu, \overline{S}_\omega)$$

$$(\log P(x_{c,i} | \mu_c, \omega_{c,i}) + \log P(\mu_c | S_\mu) + \log P(\omega_{c,i} | S_\omega))dZ_c$$

This is obtained by computing the gradients and solving $$\frac{\partial \tilde{Q}(\Theta, \overline{\Theta})}{\partial S_\mu} = 0 \text{ and } \frac{\partial \tilde{Q}(\Theta, \overline{\Theta})}{\partial S_\omega} = 0.$$

$$\frac{\partial \tilde{Q}(\Theta, \overline{\Theta})}{\partial S_\mu} = \sum_{c=1}^{nb\, classes} \int P(Z_c | X_c, \overline{\Theta}) \frac{\partial \log P(\mu_c | S_\mu)}{\partial S_\mu} dZ_c =$$

$$\sum_{c=1}^{nb\, classes} \int P(\mu_c | X_c, \overline{\Theta}) \frac{\partial \log P(\mu_c | S_\mu)}{\partial S_\mu} d\mu_c \propto$$

$$-\frac{1}{2} \sum_{c=1}^{nb\, classes} \int P(\mu_c | X_c, \overline{\Theta})(S_\mu^{-1} - S_\mu^{-1}\mu_c\mu_c^T S_\mu^{-1})d\mu_c \propto$$

$$-\frac{1}{2}\left(nbclasses \times S_\mu^{-1} - S_\mu^{-1} \sum_{c=1}^{nb\, classes} \int P(\mu_c | X_c, \overline{\Theta})\mu_c\mu_c^T d\mu_c S_\mu^{-1}\right) \propto$$

$$-\frac{1}{2}\left(nbclasses \times S_\mu^{-1} - S_\mu^{-1} \sum_{c=1}^{nb\, classes} (T_{\mu_c} + b_{\mu_c}b_{\mu_c}^T)S_\mu^{-1}\right) \frac{\partial \tilde{Q}(\Theta, \overline{\Theta})}{\partial S_\mu} =$$

$$0 \Rightarrow S_\mu = \frac{1}{nb\, classes} \sum_{c=1}^{nb\, classes} (T_{\mu_c} + b_{\mu_c}b_{\mu_c}^T)$$

Additionally:

$$\frac{\partial \tilde{Q}(\Theta, \overline{\Theta})}{\partial S_\omega} = \sum_{c=1}^{nb\, class.} \sum_{i=1}^{m_c} \int P(Z_c | X_c, \overline{\Theta}) \frac{\partial \log P(\omega_{c,i} | S_\omega)}{\partial S_\omega} dZ_c =$$

$$\sum_{c=1}^{nb\, class.} \sum_{i=1}^{m_c} \iint P(\mu_c | X_c, \overline{S}_\mu) P(\omega_{c,i} | x_{c,i}, \mu_c, \overline{S}_\omega) \frac{\partial \log P(\omega_{c,i} | S_\omega)}{\partial S_\omega}$$

$$d\omega_{c,i} \int \cdots \int \prod_{\substack{j=1 \\ j \neq i}}^{m_c} P(\omega_{c,j} | x_{c,j}, \mu_c, \overline{S}_\omega) d\omega_{c,j} d\mu_c$$

$$\sum_{c=1}^{nb\, class.} \sum_{i=1}^{m_c} \iint P(\mu_c | X_c, \overline{S}_\mu) P(\omega_{c,i} | x_{c,i}, \mu_c, \overline{S}_\omega) d\mu_c$$

$$\frac{\partial \log P(\omega_{c,i} | S_\omega)}{\partial S_\omega} d\omega_{c,i} \sum_{c=1}^{nb\, class.} \sum_{i=1}^{m_c} \int P(\omega_{c,i} | X_c,$$

$$\overline{S}_\mu, \overline{S}_\omega) \frac{\partial \log P(\omega_{c,i} | S_\omega)}{\partial S_\omega} d\omega_{c,i} \propto$$

$$-\frac{1}{2}\left(\sum_{c=1}^{nb\, classes} m_c S_\omega^{-1} \sum_{i=1}^{m_c} \int P(\omega_{c,i} | X_c, \overline{S}_\mu, \overline{S}_\omega) \omega_{c,i} \omega_{c,i}^T d\right.$$

$$\left.\omega_{c,i} S_\omega^{-1}\right) \propto -\frac{1}{2}\left(\sum_{c=1}^{nb\, classes} m_c S_\omega^{-1} -\right.$$

$$\left. S_\omega^{-1} \sum_{c=1}^{nb\, class.} \sum_{i=1}^{m_c} (T_{\omega_{c,i}} + b_{\omega_{c,i}}b_{\omega_{c,i}}^T)S_\omega^{-1}\right) \frac{\partial \tilde{Q}(\Theta, \overline{\Theta})}{\partial S_\omega} =$$

$$0 \Rightarrow S_\omega = \frac{1}{nb\,classes} \frac{\sum_{c=1}^{nb\,class.} \sum_{i=1}^{m_c} \left(T_{\omega_{c,i}} + b_{\omega_{c,i}} b_{\omega_{c,i}}^T\right)}{\sum_{c=1}^{m_c}}$$

The expectation-maximization algorithm is performed iteratively by successively computing at step 210 the variables $T_{\mu_c}$, $b_{\mu_c}$, $T_{\omega_{c,i}}$ and $b_{\omega_{c,i}}$, and by adapting the values of $S_\mu$ and $S_\omega$—and hence of $\overline{\Theta}$—at step 220 until convergence. At each new iteration of step 210, the new value of $\overline{\Theta}$ obtained at preceding step 220 is reused.

The invention claimed is:

1. A method to compare two data obtained from a sensor or interface, implemented by a processor, the method comprising steps of:
   extracting features from the two obtained data, resulting in feature vectors x,y, and in quality vectors qx,qy associated with the feature vectors x,y respectively,
   applying a learning algorithm to determine the covariance matrices of the means of the classes to which the vectors belong and of the deviations of the vectors from the class means,
   computing a similarity function between the two features x,y of the two obtained data, wherein each feature vector of a datum is modified as the summation of three independent Gaussian variables μ+ω+ε, where said variables are:
   a mean μ of a class to which the vector belongs,
   an intrinsic deviation ω, and
   an observation noise ε of the vector, quality vectors qx,qy comprising information on the observation noise of the feature vectors x,y respectively, the components of the quality vectors qx,qy being generated as a function of type of datum and type of features forming the feature vectors x,y respectively, and wherein the similarity function is computed from the feature vectors x,y and the associated quality vectors qx,qy as a function of the covariance matrices of the components of the feature vectors x,y, and the observation noise covariance matrices of the features vectors x,y are obtained as a function of the associated quality vectors qx,qy respectively; and
   comparing the result of the computed similarity function with a threshold to determine whether the two data belong to a common class.

2. The comparison method according to claim 1, wherein the covariance matrixes of the components of the feature vectors comprise the covariance matrices that are respectively the covariance matrix of the means of the classes to which the vectors belong is called inter-class covariance matrix, and the covariance matrix of vector deviations from the class means is called intra-class covariance matrix.

3. The comparison method according to claim 1, wherein the similarity function is the logarithm of the ratio between a probability density the feature vectors with the feature vectors belonging to one same class, and a probability density of the feature vectors with the feature vectors belonging to two different classes.

4. The comparison method according to claim 1, wherein the learning algorithm is an algorithm of expectation-maximization type.

5. The comparison method according to claim 1, wherein the similarity function is given by the formula:

$$LR(x,y|S_{\varepsilon_x}, S_{107\,y}) = x^T(A-(S_\mu+S_{107}+S_{\varepsilon_x})^{-1})x + y^T(C-(S_\mu+S_{107}+S_{\varepsilon_y})^{-1})y + 2x^TBy - \log|S_\mu+S_{107}+S_{249\,x}| - \log|A| + \text{constant}$$

where:

$$A = (S_\mu+S_\omega+S_{\varepsilon_x} - S_\mu(S_\mu+S_{107}+S_{249\,y})^{-1}$$

$$B = -AS_\mu(S_\mu+S_\omega+S_{\varepsilon_y})^{-1}$$

$$C = (S_\mu+S_\omega+S_{\varepsilon_y})^{-1}(I+S_\mu AS_\mu(S_\mu+S_\omega+S_{\varepsilon_y})^{-1})$$

and where $S_\mu$ is the covariance matrix of the means of the classes, $S_{107}$ is the covariance matrix of the deviations from a mean, and $S_{\varepsilon_x}$ and $S_{\varepsilon_y}$ are the covariance matrices of the observation noises of vectors x and y respectively.

6. The comparison method according to claim 1, wherein the computer data derived from sensors or interfaces are data representing physical objects or physical magnitudes.

7. The comparison method according to claim 6, wherein the computer data derived from sensors or interfaces are images, and the feature vectors are obtained by applying at least one filter to the images.

8. A computer program product comprising a non-transitory computer-readable medium comprising code instructions that, when executed by a processor, carry out a method comprising steps of:
   extracting features from two obtained data, resulting in feature vectors x,y, and in quality vectors qx,qy associated with the feature vectors x,y respectively,
   applying a learning algorithm to determine the covariance matrices of the means of the classes to which the vectors belong and of the deviations of the vectors from the class means,
   computing a similarity function between the two features x,y of the two obtained data, wherein each feature vector of a datum is modified as the summation of three independent Gaussian variables μ+ω+ε, where said variables are:
   a mean μ of a class to which the vector belongs,
   an intrinsic deviation ω, and
   an observation noise ε of the vector,
   quality vectors qx,qy comprising information on the observation noise of the feature vectors x,y respectively, the components of the quality vectors qx,qy being generated as a function of type of datum and type of features forming the feature vectors x,y respectively, and wherein the similarity function is computed from the feature vectors x,y and the associated quality vectors qx,qy as a function of the covariance matrices of the components of the feature vectors x,y, and the observation noise covariance matrices of the features vectors x,y are obtained as a function of the associated quality vectors qx,qy respectively; and
   comparing the result of the computed similarity function with a threshold to determine whether the two data belong to a common class.

9. A system comprising:
   a database comprising a plurality of labelled data;
   a data acquisition unit; and
   a processing unit comprising a processor which compares two obtained data by implementing a method comprising steps of:
   extracting features from the two obtained data, resulting in feature vectors x,y, and in quality vectors qx,qy associated with the feature vectors x,y respectively,
   applying a learning algorithm to determine the covariance matrices of the means of the classes to which the vectors belong and of the deviations of the vectors from the class means, computing a similarity function between the two features x,y of the two obtained data, wherein each feature vector of a datum is modified as the summation of three independent Gaussian variables $\mu+\omega+\varepsilon$, where said variables are:

a mean $\mu$ of a class to which the vector belongs, an intrinsic deviation $\omega$, and an observation noise $\varepsilon$ of the vector, quality vectors qx,qy comprising information on the observation noise of the feature vectors x,y respectively, the components of the quality vectors qx,qy being generated as a function of type of datum and type of features forming the feature vectors x,y respectively, and wherein the similarity function is computed from the feature vectors x,y and the associated quality vectors qx,qy as a function of the covariance matrices of the components of the feature vectors x,y, and the observation noise covariance matrices of the features vectors x,y are obtained as a function of the associated quality vectors qx,qy respectively; and comparing the result of the computed similarity function with a threshold to determine whether the two data belong to a common class.

* * * * *